(12) United States Patent
Afriat

(10) Patent No.: US 7,078,673 B1
(45) Date of Patent: Jul. 18, 2006

(54) METHOD AND SENSING DEVICE FOR MOTION DETECTION IN AN OPTICAL POINTING DEVICE, SUCH AS AN OPTICAL MOUSE

(75) Inventor: Gil Afriat, Monument, CO (US)

(73) Assignee: EM Microelectronic-Marin SA, Marin (CH)

( * ) Notice: Subject to any disclaimer, the term of this patent is extended or adjusted under 35 U.S.C. 154(b) by 8 days.

(21) Appl. No.: 11/020,108

(22) Filed: Dec. 27, 2004

(51) Int. Cl.
*G06M 7/00* (2006.01)
*G01N 21/86* (2006.01)
*G09G 5/08* (2006.01)

(52) U.S. Cl. .................. 250/221; 250/559.32; 345/166
(58) Field of Classification Search ................ 250/221, 250/559.32
See application file for complete search history.

(56) References Cited

U.S. PATENT DOCUMENTS 6,806,458 B1   10/2004   Rotzoll et al.

FOREIGN PATENT DOCUMENTS

WO       WO 03/049018 A1 *  6/2003

\* cited by examiner

*Primary Examiner*—Georgia Epps
*Assistant Examiner*—Pascal M. Bui-Pho
(74) *Attorney, Agent, or Firm*—Sughrue Mion, PLLC

(57) ABSTRACT

There is described a method for measuring relative motion between an illuminated portion of a surface and an optical sensing device comprising a photodetector array including a plurality of rows and columns of pixels respectively aligned along first and second axes comprising essentially the steps of comparing at a first point in time light intensity between neighbouring pixels of the photodetector array and determining along each of the first and second axes, edge direction data from the detected first light intensity pattern, extracting edge inflection data from the edge direction data from the detected first light intensity pattern, comparing at a second point in time light intensity between neighbouring pixels and determining along each of said first and second axes, the edge direction data from the detected second light intensity pattern, extracting edge inflection data from the edge direction data from the detected second light intensity pattern. The method further comprises the steps of extracting inflection line data being descriptive of the succession of two adjacent edge inflection data of the same type transversal to at least one determined axis, counting a total number of the extracted line conditions and determining a measurement of the relative motion between the optical sensing device and the illuminated portion of the surface along the determined axis based on a ratio of a comparison of the edge inflection data previously extracted and a function of the total number of inflection conditions and the total number of line conditions.

7 Claims, 3 Drawing Sheets

METHOD AND SENSING DEVICE FOR MOTION DETECTION IN AN OPTICAL POINTING DEVICE, SUCH AS AN OPTICAL MOUSE

FIELD OF THE INVENTION

The present invention generally relates to pointing devices, in particular for controlling the position of a cursor on a screen, such as the display of a personal computer, workstation or other computing devices having a graphic user interface. Such pointing devices may for instance include mice, trackballs and other computer peripherals for controlling the position of a cursor on a display screen.

The present invention more particularly relates to the field of optical pointing devices which comprise an optical sensing device including a photodetector array for measuring the varying intensity pattern of a portion of a surface which is illuminated with radiation and for extracting information about the relative motion between the photodetector array and the illuminated portion of the surface.

BACKGROUND OF THE INVENTION

Such an optical pointing device is already known in the art. International Patent Application No WO 03/049018, filed in the name of the same Assignee, which is incorporated herein by reference, discloses a method as well as a device for motion detection in an optical sensing device, such as an optical mouse.

FIG. 1 is a generalized schematic bloc diagram of an optical pointing device in accordance with the prior art. It comprises a photodetector array 420 including a plurality of pixels, this photodetector array 420 being coupled to processing means 400 (or motion detection processing circuit) for processing the signals outputted by the photodetector array 420.

A comparator array 415 may be interposed between processing means 400 and array 420, this comparator array 415 including a plurality of comparator circuits each for comparing the light intensity of a first pixel of array 420 with the light intensity of a second pixel of array 420 and for outputting a resulting edge direction condition.

A distinction is made between edges according to their "direction". In particular, one defines two distinct edge direction conditions: (i) a first edge condition, or positive edge, defined as a condition wherein the light intensity of a first pixel is less than the light intensity of a second pixel; and (ii) a second edge condition, or negative edge, defined as a condition wherein the light intensity of the first pixel is greater than the light intensity of the second pixel.

Taking photodetector array 420 as an example, a first axis, namely axis X, extends with a positive direction from left to right and a second axis, namely axis Y, extends with a positive direction from bottom to top. Accordingly, a positive edge will be defined between a selected pixel and a pixel on its right if the detected light intensity of the selected pixel is less than the light intensity of the pixel on its right. Conversely, and taking the example of two pixels aligned along axis Y, a negative edge will be defined between the selected pixel and a pixel on its upper side if the light intensity of the selected pixel is greater than the light intensity of the upper pixel. Both compared pixels can be adjacent or non-adjacent.

The optical pointing device further comprises at least one light source 410 such as a LED, which produces radiation that impinges on a portion of a surface S. Surface S may be a planar or non-planar surface, such as a surface over which the pointing device is moved (as in the case of an optical mouse), the surface of a ball (as in the case of an optical trackball) or any other suitable surface that may provide an appropriate intensity pattern for detection by photodetector array 420. It should be mentioned that a light source is not, strictly speaking, necessary and that ambient light reflected by surface S may directly be used.

Processing means 400 is further adapted to communicate in a bi-directional manner with an interface 450 that communicates in turn with a host system (not illustrated) over a bus 455. Cursor control signals (and eventually other signals related to the optical pointing device) are supplied to the host system over bus 455. Processing means 400 may also receive information, such as configuration signals, over bus 455 from the host system.

Processing means 400 is essentially designed to intermittently sample the pixel outputs of photodetector array 420 in accordance with a defined sequence. The edge information of two successive samples is compared and a relative motion measurement is extracted by processing means 400. The adequate cursor control signals are then derived from the relative motion measurement and transmitted to the host system via line interface 450.

Still referring to the International Patent Application No WO 03/049018, it is disclosed a so-called "Peak/Null Motion Detection" algorithm. Each row and column of the photodetector array is further analysed to find specific inflection conditions (hereinafter defined as a first inflection condition, or "peak", and a second inflection condition, or "null") in the direction of successive edges along a selected axis (in practice along both the X and Y axes). As illustrated in FIG. 2, the first inflection condition, or peak, is defined as the succession, along a determined axis (X or Y), of a positive edge (arrow pointing upwards in FIG. 2) followed by a negative edge (arrow pointing downwards in FIG. 2). Similarly, the second inflection condition, or null, is defined as the succession, along the determined axis, of a negative edge followed by a positive edge.

In contrast to the above edge direction conditions, it will be appreciated that the edge inflection conditions do not appear everywhere. Strictly speaking, one should also consider that there exists a third inflection condition representative of the fact that there does not exist, at a selected location, any inflection in the direction of the edges.

With reference to FIG. 3, one will now describe the basic principle for detecting motion based on the above edge inflection data. FIG. 3 schematically shows an exemplary situation (in case of single axis motion detection) of a succession of ten successive edge direction conditions and extracted edge inflection conditions determined from two successive flashes (i.e. conditions derived from two successive light intensity patterns detected by the photodetector array). This exemplary situation is typical of sub-pixel motion (displacement of less than the pixel pitch between two successive flashes). As shown in FIG. 3, three edge inflection conditions are detected, namely a peak between the second and third edge direction conditions, a null between the fourth and fifth edge direction conditions, and a peak between the seventh and eighth edge direction conditions. Following the second flash, one can see that only the null condition moved one unit to the right (this situation again being typical of sub-pixel motion). In addition to accumulators for tracking motion of edge inflection conditions, one additional accumulator per axis is provided for counting the total number of edge inflection conditions (peaks and nulls together) appearing on each axis.

Referring again to the exemplary situation of FIG. 3, one will understand that the accumulator associated to the tracking of motion of edge inflection conditions would be incremented, the total number of peaks and nulls detected by accumulator associated for counting the total number of edge inflection conditions being in this case three. In case of motion detection along two axes (as in the case of an optical pointing device), one will of course have understood that these steps are performed for each row of the array along axis X and each column of the array along axis Y.

A calculation method may consist in computing the displacement values along axes X and Y directly, as summarized by the following analytical expressions:

$$X_{DISPLACEMENT} = \frac{(N_{PEAK-RIGHT} + N_{NULL-RIGHT}) - (N_{PEAK-LEFT} + N_{NULL-LEFT})}{(N_{XPEAK} + N_{XNULL})} \quad (1)$$

$$Y_{DISPLACEMENT} = \frac{(N_{PEAK-UP} + N_{NULL-UP}) - (N_{PEAK-DOWN} + N_{NULL-DOWN})}{(N_{YPEAK} + N_{YNULL})} \quad (2)$$

This method requires a minimum of two accumulators per axis, one for tracking motion of edge inflection conditions (peaks and nulls being still tracked independently) and another one for tracking the total number of edge inflection conditions detected along the selected axis.

Although this calculation method gives acceptable results in most situations, it has been shown within the scope of the present invention that the detected motion is not as reliable as it could be in some critical situations. In fact, when the optical sensor is illuminated along one axis (e.g. along axis Y), while the detected motion with the above described calculation method is close to the real motion along the non-illuminated axis (i.e. axis X), conversely, the motion detected along the illuminated axis is much less reliable. In the case of illumination in between both axes, the detected motion along both axes becomes less reliable.

SUMMARY OF THE INVENTION

The object of the invention is thus to overcome drawbacks of the aforementioned prior art by providing a more reliable detection motion calculation method wherever comes from the illumination of the optical sensor. For that purpose, it is provided with a method for measuring relative motion between an illuminated portion of a surface and an optical sensing device comprising a photodetector array including a plurality of rows and columns of pixels respectively aligned along first and second axes, said method comprising the steps of:

a) detecting by means of said photodetector array a first light intensity pattern of said illuminated portion of the surface at a first point in time;

b) comparing light intensity between neighbouring pixels of said photodetector array and determining along each of said first and second axes edge direction data from said detected first light intensity pattern, which edge direction data is descriptive of light intensity differences between said neighbouring pixels and includes:

a first edge condition, or positive edge, defined as a condition wherein the light intensity of a first pixel is less than the light intensity of a second pixel; and a second edge condition, or negative edge, defined as a condition wherein the light intensity of said first pixel is greater than the light intensity of said second pixel;

c) extracting edge inflection data from said edge direction data, said edge inflection data being descriptive of the succession of positive and negative edges along each of said first and second axes of said photodetector array and including:

a first inflection condition, or peak, defined as the succession, along one of said axis, of a positive edge followed by a negative edge; and a second inflection condition, or null, defined as the succession, along one of said axis, of a negative edge followed by a positive edge;

d) storing said edge inflection data extracted from said edge direction data;

e) detecting a second light intensity pattern of said illuminated portion of the surface at a second point time;

f) comparing light intensity between neighbouring pixels of said photodetector array and determining along each of said first and second axes said edge direction data from said detected second light intensity pattern;

g) extracting edge inflection data from said edge direction data from said detected second light intensity pattern;

wherein said step c) or g) further includes the steps of (α) counting a total number of said inflection conditions extracted at step c) or g) along each of said first and second axes; and (β) extracting inflection line data being descriptive of the succession of two adjacent edge inflection data of the same type transversal to at least one determined axis of said first and second axes and including:

a first line condition, or line of peaks, defined as the succession, transversal to said determined axis, of two adjacent peaks; and a second line condition, or line of nulls, defined as the succession transversal to said determined axis, of two adjacent nulls, and (γ) counting a total number of line conditions transversal to said at least one determined axis;

and wherein the method further comprises the step of:

h) determining a measurement of the relative motion between said optical sensing device and said illuminated portion of the surface along said at least one determined axis based on a ratio of:

(h1) a comparison of said edge inflection data extracted at steps c) and g) and (h2) a function of the counted total number of inflection conditions along said at least one determined axis and the total number of line conditions transversal to said at least one determined axis.

With respect to the "Peak/Null Motion Detection" algorithm of the prior art, this calculation method further introduces, in particular, inflection line data being descriptive of the succession of two adjacent edge inflections of the same type transversally detected along each of said first and second axes and including (i) a first line condition, or line of peaks, defined as the succession, transversally to one of said axis, of two adjacent peaks and (ii) a second line condition, or line of nulls, defined as the succession, transversally to one of said axis, of two adjacent nulls.

It has been shown within the scope of the present invention that these inflection line conditions are closely related to the real amount of motion, in particular, it is more likely to detect a line condition subsequently to a real motion of the mouse. Further in the case that the optical sensor is illuminated along one determined axis, the number of detected line conditions is much greater transversally to the illuminated axis. Therefore, taking into account these line conditions in the calculation method, especially along the illuminated axis improves the reliability of the detected motion.

FIGURES

Other aspects, features and advantages of the present invention will be apparent upon reading the following detailed description of non-limiting examples and embodiments made with reference to the accompanying drawings.

DETAILED DESCRIPTION OF THE INVENTION

Figure 1:
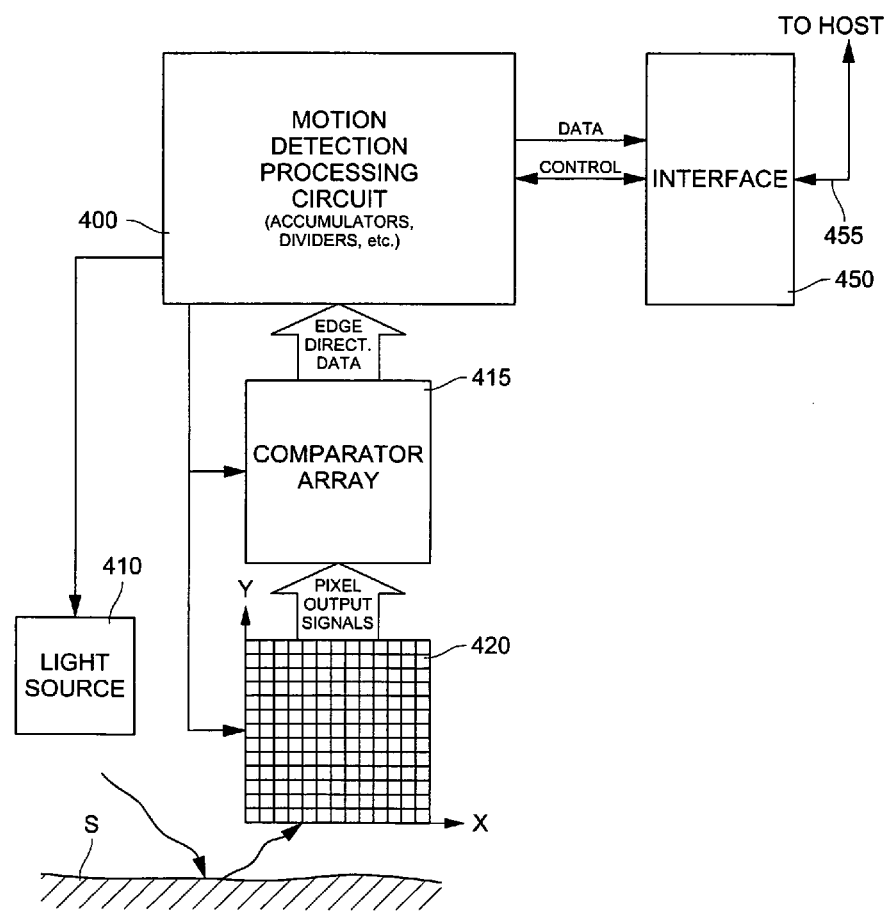
FIG. 1 is a schematic block diagram of an optical pointing device according to the prior art.
Figure 2:
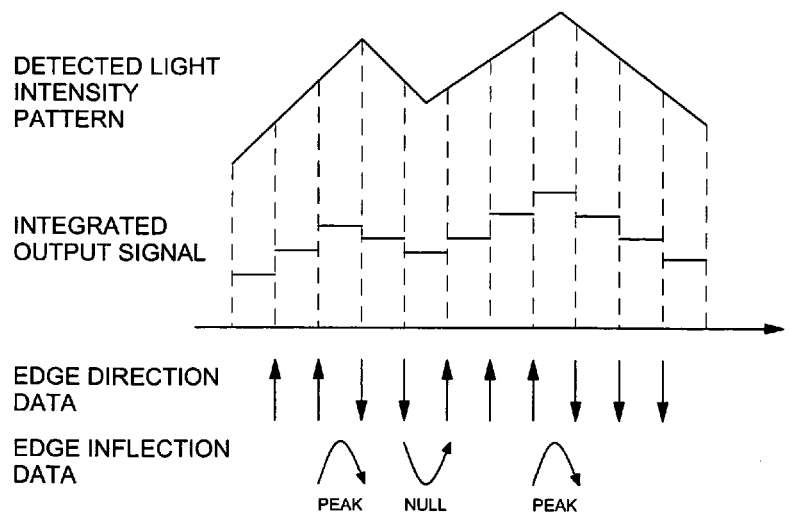
FIG. 2 is a schematic illustration of edge inflection conditions, or peaks and nulls, derived from a sequence of edge direction conditions along a determined axis according to the "Peak/Null motion detection" technique of the prior art.
Figure 3:
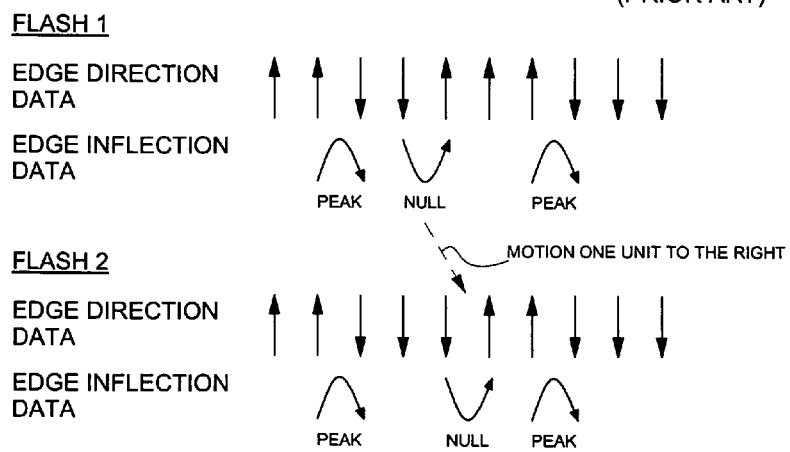
FIG. 3 is a schematic illustration of a motion detection technique which is based on the tracking of peaks and nulls along one axis according to the "Peak/Null motion detection" technique of the prior art.

In the following description, the motion detection method will be described in an illustrative and non-limiting manner in relation with an optical pointing device as illustrated in FIG. 1. However, it will be appreciated that any other suitable optical pointing device may be used in order to implement the method according to the invention. Furthermore, the following motion detection method is based on the so-called "Peak/Null motion algorithm" described in the International Patent Application No WO 03/049018, and will be called as the "Line feature algorithm" herein under.

Figure 4A:
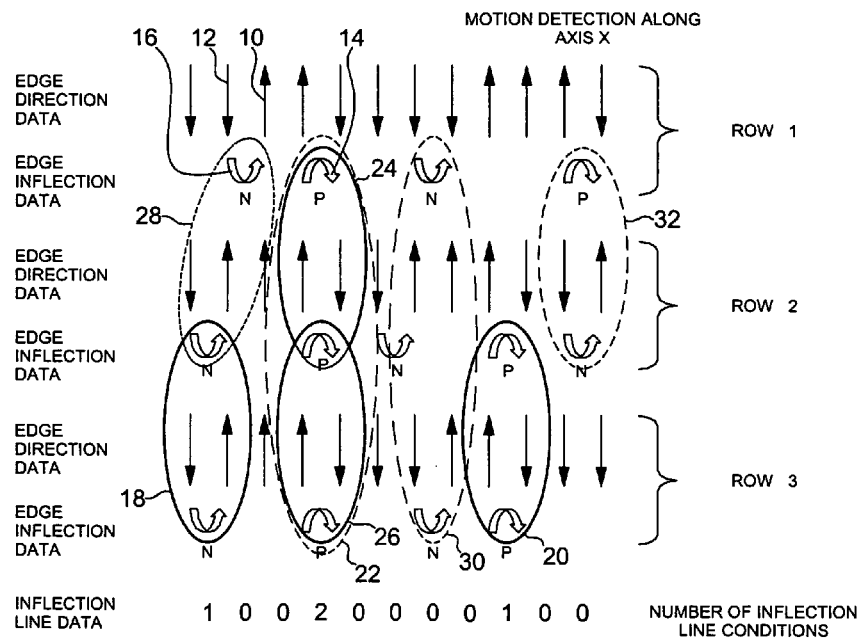
FIGS. 4a and 4b are schematic illustrations of a preferred embodiment of the motion detection technique which is based on the tracking of peaks and nulls along one axis and of lines of peaks and lines of nulls transverse to this axis.
Figure 4B:
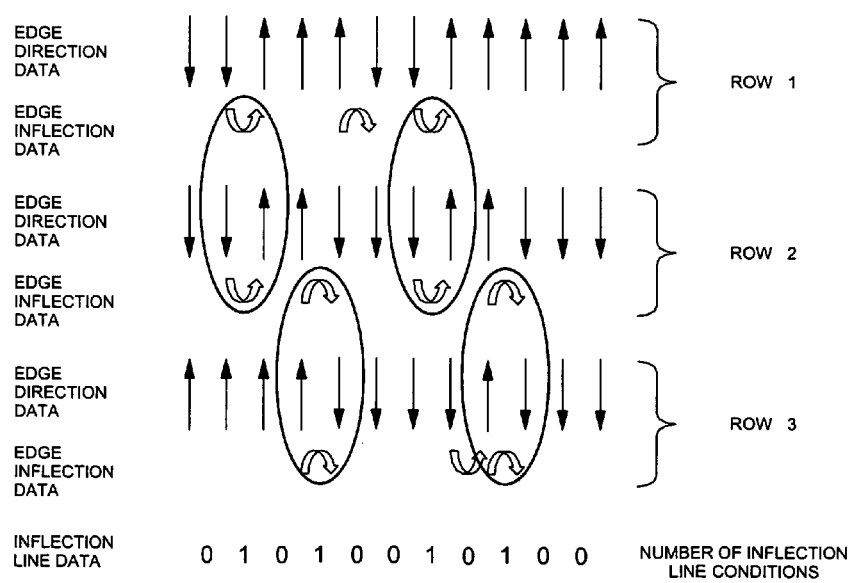

With reference to FIGS. 4a and 4b, one will now describe the basic principle for detecting motion based on the edge inflection data and inflection line data. FIGS. 4a and 4b schematically show an exemplary situation (in case of one axis motion detection) of a succession of successive edge direction conditions along three rows 1, 2 and 3 and extracted edge inflection conditions as well as extracted inflection line conditions there from determined for two successive flashes N and N+1 (i.e. conditions derived from light intensity patterns detected by the photodetector array).

As shown in FIGS. 4a and 4b, upward and downward arrows 10 and 12 correspond respectively to positive and negative edge conditions. These edge conditions are descriptive of light intensity differences between neighbouring pixels along one axis and include a positive edge defined as a condition wherein the light intensity of a first pixel is less than the light intensity of a second pixel and a negative edge defined as a condition wherein the light intensity of the first pixel is greater than the light intensity of the second pixel. Thus in the represented example of FIGS. 4a and 4b, each arrow is pointing from the darker pixel (with low light intensity) to the lighter pixel (with high light intensity).

From edge direction conditions, edge inflection conditions are extracted. These edge inflection conditions, shown as downward and upward curved arrows 14 and 16, are descriptive of the succession of positive and negative edges along one axis. A first inflection condition, or peak (P), is defined as the succession, of a positive edge followed by a negative edge. A second inflection condition, or null (N), is defined as the succession of a negative edge followed by a positive edge.

As shown on FIG. 4a, four edge inflection conditions, namely two peaks and two nulls, five edge inflection conditions, namely two peaks and three nulls, and four edge inflection conditions, namely two peaks and two nulls, have been respectively detected along rows 1, 2 and 3.

Preferably, peaks and nulls are tracked independently. One may envisage to track the edge inflection conditions without regard to their type. Tracking along each axis may simply be achieved by associating at least one accumulator per axis (or alternatively two accumulators per axis for keeping track of motion of peaks and nulls separately), which is incremented or decremented according to the direction of motion of the edge inflection condition (this accumulator being left not adjusted in case of no motion of an edge inflection condition). In addition to accumulators for tracking motion of edge inflection conditions, additional accumulators are provided for counting the total number of peaks and nulls appearing on each axis. One accumulator per axis may be provided for tracking the total number of edge inflection conditions (peaks and nulls together).

Referring again to the exemplary situation of FIGS. 4a and 4b, on row 1 between flashes N and N+1, one edge inflection condition, namely a peak, has moved to the right and another edge inflection condition, also a peak, has disappeared. In the case using only one accumulator per axis for tracking motion of inflection conditions, the accumulator provided for this axis is incremented once (motion detection to the right). On row 2, between flashes N and N+1, two edge inflection conditions, namely two nulls, has moved to the right and a third edge inflection condition, also a null, has disappeared. Then, the accumulator is further incremented twice. On line 3, between flashes N and N+1, one edge inflection condition, namely a null, has moved to the right and another edge inflection condition, also a null, has disappeared. Then, the accumulator is further incremented once. In this example, the accumulator has been incremented four times because four inflection conditions moving to the right have been detected. In the same manner, it would have been decremented if inflection condition moving to the left would have been detected. It will be appreciated that any other motion detection technique (e.g. using diagonals for detecting inflection motion) disclosed in the International Patent Application No WO 03/049018 may of course be applied to the present motion detection method. In order to determine the overall displacement between the optical pointing device and the illuminated surface portion, detection and count of inflection conditions have to be proceeded along both axes of the photodetector array.

However, within the scope of the present invention, it has been shown that a more accurate formula for counting displacement or motion is obtained by introducing the notion of lines, i.e. two adjacent inflections transversal to a same axis. The idea for introducing this correction in the motion detection algorithm is that when at least two inflections from the same direction (left or right) have contribute to form one inflexion in the next flash, a correction factor has to take into consideration these multiple inflexion contributions.

Inflection line data is extracted from edge inflection data. In the case of a photodetector array including a plurality of rows and columns of pixels aligned along two axes (X, Y), lines features or inflection lines consist of two inflections and are defined for X-axis and for Y-axis as follow:

X-axis inflection lines, if an X-peak (detected along axis X) exists below another X-peak, an X-peak inflection line is detected, and if an X-null exists below another X-null, an X-null inflection line is detected;

Y-axis inflection lines, if a Y-peak (detected along axis Y) exists to the right of another Y-peak, a Y-peak inflection line is detected, and if a Y-null exists to the right of another Y-null, a Y-null inflection line is detected.

It is to note that, X-lines and Y-lines are defined transversally to the motion detection axis. Thus X-lines are defined along the Y-axis and Y-lines are defined along the X-axis.

Referring back again to the exemplary situation of FIG. 4a, motion is detected along axis X. Then X-lines defined transversals to axis X, i.e. along axis Y, have to be considered. The two edge inflections have to be of the same type (peak or null) and adjacent to be considered as an inflection line. One will distinguish a line of nulls 18 and a line of peaks 20 between row 2 and row 3. Each pair of several adjacent inflections aligned along the same transversal line is considered as an inflection line, i.e. three adjacent peaks 22 transversal to axis X, i.e. aligned along the Y-axis, are considered as two inflection lines 24 and 26. Further, care should be taken in disregarding succession of inflection conditions which are not inflection lines as defined above. An inflection line is detected only if the two inflections are aligned along a transversal line. Thus, inflections aligned along a diagonal inflection line 28 are not considered as an inflection line. Furthermore, a line of two non-adjacent inflections 30, even of the same type, or two adjacent inflections 32 of different type (a peak following a null or vice versa) are not considered as an inflection line. At least one accumulator per axis is provided for counting the total number of detected inflection lines transversal to this axis. It will be appreciated that two accumulators may be provided for counting separately the total number of lines of peaks and the total number of lines of nulls. In case of motion detection along two axes (as in the case of an optical pointing device), one will of course have understood that these steps are performed for each row of the array along axis X and each column of the array along axis Y.

For each flash, according to the so-called "line feature algorithm", the total number of X-lines ($N_{XLINE}$) transversal to axis X, and the total number of Y-lines ($N_{YLINE}$) transversal to axis Y, shall be counted. The total number of X-lines corresponds to the sum of the total number of lines of peaks and lines of nulls transversal to axis X ($N_{XLINE}=N_{X-PEAK-LINE}+N_{X-NULL-LINE}$). The total number of Y-lines corresponds to the sum of the total number of lines of peaks and lines of nulls transversal to axis Y ($N_{YLINE}=N_{Y-PEAK-LINE}+N_{Y-NULL-LINE}$).

According to a preferred embodiment of the invention, the calculation method consists in computing the displacement values along axes X and Y directly, as summarized by the following analytical expressions:

$$X_{DISPLACEMENT} = \frac{(N_{PEAK-RIGHT} + N_{NULL-RIGHT}) - (N_{PEAK-LEFT} + N_{NULL-LEFT})}{F(N_{X-INFLECTION}, N_{XLINE-PREV})} \quad (3)$$

$$Y_{DISPLACEMENT} = \frac{(N_{PEAK-UP} + N_{NULL-UP}) - (N_{PEAK-DOWN} + N_{NULL-DOWN})}{F(N_{Y-INFLECTION}, N_{YLINE-PREV})} \quad (4)$$

This method requires a minimum of three accumulators per axis, one for tracking motion of edge inflection conditions (peaks and nulls being still tracked independently), another one for tracking the total number of edge inflection conditions detected along the selected axis and still another one for tracking the total number of inflection lines detected transversal to the selected axis.

The numerator of formula (3) corresponds to the number of inflections (peaks and nulls together) moving to the right from which is subtracted the number of inflections moving to the left, along axis X, and the numerator of formula (4) corresponds to the number of inflections moving upward from which is subtracted the number of inflections moving downward, along axis Y.

In comparison with the displacement calculation of the prior art (see International Patent Application No WO 03/049018), the new calculation method has introduced a new function on the denominator that may be user defined, which is advantageously of the following form, for X displacement calculation:

$$F(N_{X-INFLECTION}, N_{XLINE-PREV})=A \times N_{X-INFLECTION} + B \times N_{XLINE-PREV} \quad (5)$$

and for Y displacement calculation:

$$F(N_{Y-INFLECTION}, N_{YLINE-PREV})=A \times N_{Y-INFLECTION} + B \times N_{YLINE-PREV} \quad (6)$$

while:

$N_{X-INFLECTION}=N_{X-PEAK}+N_{X-NULL}$ (total number of inflections along axis X);

$N_{Y-INFLECTION}=N_{Y-PEAK}+N_{Y-NULL}$ (total number of inflections along axis Y);

$N_{X-LINE-PREV}$ is the total number of lines transversal to axis X in the previous flash;

$N_{Y-LINE-PREV}$ is the total number of lines transversal to axis Y in the previous flash; and A and B are real number weighting coefficients that may be user defined.

It will be appreciated that the expressions (5) and (6) refer to the total number of inflection lines in the previous flash, however the average total number of inflection lines is not suppose to change drastically from one flash to the next, except in the case of a lift condition of the optical pointing device from the illuminated surface portion. In such a case, a lift detection mechanism may be provided for stopping motion detection. Therefore, the expressions (5) and (6) can also be used with the total number of inflection lines in the current flash instead of the total number of inflection lines in the previous one.

Concerning A and B values, these should be taken in the range of 0 to 10. According to a first variant, the value of the first weighting coefficient A is chosen in the range from 0 to 1 and the value of the second weighting coefficient B is chosen in the range from 1 to 8. According a preferred variant, the value of the first weighting coefficient A is chosen in the range from 0.125 to 0.4 and the value of the second weighting coefficient B is chosen in the range from 2 to 6.

The displacements defined in the above expressions (3) and (4) are then averaged and the result may be scaled by the pixel pitch $L_{PP}$ to give the overall distance moved along each axis.

$$X_{DISTANCE} = X_{DISPLACEMENT} \cdot L_{PP} \quad (7)$$

$$Y_{DISTANCE} = Y_{DISPLACEMENT} \cdot L_{PP} \quad (8)$$

Having described the invention with regard to certain specific embodiments, it is to be understood that these embodiments are not meant as limitations of the invention. Indeed, various modifications and/or adaptations may become apparent to those skilled in the art without departing from the scope of the annexed claims. For instance, the proposed embodiments are not necessarily limited to sensing devices comprising a regular array of pixels aligned along two orthogonal axes. Other pixel arrangements may be envisaged, such as pixel arrangements including pixels aligned along two (or more) non orthogonal axes.

Finally, it will again be appreciated that each comparator input may be connected to more than one photosensitive element. For instance, the output signals of several adjacent or even non-adjacent pixels may be summed so as to create a "filtered" pixel as schematically illustrated in FIG. 13 of U.S. Pat. No. 6,806,458 in the name of the same Assignee.

What is claimed is:

1. A method for measuring relative motion between an illuminated portion of a surface and an optical sensing device comprising a photodetector array including a plurality of rows and columns of pixels respectively aligned along first and second axes, said method comprising the steps of:
    a) detecting by means of said photodetector array a first light intensity pattern of said illuminated portion of the surface at a first point in time;
    b) comparing light intensity between neighbouring pixels of said photodetector array and determining along each of said first and second axes edge direction data from said detected first light intensity pattern, which edge direction data is descriptive of light intensity differences between said neighbouring pixels and includes:
        a first edge condition, or positive edge, defined as a condition wherein the light intensity of a first pixel is less than the light intensity of a second pixel; and
        a second edge condition, or negative edge, defined as a condition wherein the light intensity of said first pixel is greater than the light intensity of said second pixel;
    c) extracting edge inflection data from said edge direction data, said edge inflection data being descriptive of the succession of positive and negative edges along each of said first and second axes of said photodetector array and including:
        a first inflection condition, or peak, defined as the succession, along one of said axis, of a positive edge followed by a negative edge; and
        a second inflection condition, or null, defined as the succession, along one of said axis, of a negative edge followed by a positive edge;
    d) storing said edge inflection data extracted from said edge direction data;
    e) detecting a second light intensity pattern of said illuminated portion of the surface at a second point time;
    f) comparing light intensity between neighbouring pixels of said photodetector array and determining along each of said first and second axes said edge direction data from said detected second light intensity pattern;
    g) extracting edge inflection data from said edge direction data from said detected second light intensity pattern;
    wherein said step c) or g) further includes the steps of
    (α) counting a total number of said inflection conditions extracted at step c) or g) along at least one of said first and second axes; and
    (β) extracting inflection line data being descriptive of the succession of two adjacent edge inflection data of the same type transversal to said at least one of said first and second axes and including:
        a first line condition, or line of peaks, defined as the succession, transversal to said axis, of two adjacent peaks; and
        a second line condition, or line of nulls, defined as the succession transversal to said determined axis, of two adjacent nulls, and
    (γ) counting a total number of line conditions transversal to said at least one axis; and wherein the method further comprises the step of:
    h) determining a measurement of the relative motion between said optical sensing device and said illuminated portion of the surface along said at least one axis based on a ratio of:
    (h1) a comparison of said edge inflection data extracted at steps c) and g) and
    (h2) a function of the counted total number of inflection conditions along said at least one determined axis and the total number of line conditions transversal to said at least one determined axis.

2. The method of claim 1, wherein said surface portion is illuminated along one determined axis and wherein step (β) is achieved with respect to said determined axis.

3. The method of claim 1, wherein steps (β), (γ) are achieved along both first and second axes and wherein said step (h) includes:
    determining a measurement of the relative motion between said optical sensing device and said illuminated portion of the surface along each of said first and second axes based on a ratio of:
(h1) said comparison of said edge inflection data extracted at steps c) and g) and
(h2) a function of the counted total number of inflection conditions along each of said first and second axes and the total number of line conditions transversal to each of said first and second axes.

4. The method of claim 3, wherein said function of the counted total number of inflection conditions and the total number of line conditions is based on a first weighting coefficient associated with the total number of inflection conditions and a second weighting coefficient smaller than the first one associated with the total number of line conditions.

5. The method of claim 4, wherein the function of the counted total number of inflection conditions and the total number of line conditions is of the following form:

$F(Nx\text{inf}, Nx\text{line\_prev}) = A \times Nx\text{inf} + B \times Nx\text{line\_prev};$ and $F(Ny\text{inf}, Ny\text{line\_prev}) = A \times Ny\text{inf} + B \times Ny\text{line\_prev};$ along said first, respectively second axis, and where A and B are said first and second weighting coefficients.

6. The method of claim 5, wherein a value of the first weighting coefficient is chosen in the range from 0 to 1 and a value of the second weighting coefficient is chosen in the range from 1 to 8.

7. The method of claim 6, wherein said value of the first weighting coefficient is chosen in the range from 0.125 to 0.4 and the value of the second weighting coefficient is chosen in the range from 2 to 6.

* * * * *